3,188,223
PROTEIN-POLYMERIC DIALDEHYDE COMPOSITIONS AND PROCESS OF COATING A BASE THEREWITH

Francis B. Weakley and Charles L. Mehltretter, Peoria, Ill., assignors to the United States of America as represented by the Secretary of Agriculture
No Drawing. Filed Nov. 14, 1960, Ser. No. 69,237
14 Claims. (Cl. 106—139)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to water resistant protein-polymeric dialdehyde compositions and to an improved process for the preparation of water resistant polymeric dialdehyde-modified proteins. The invention also relates to the process of forming a water resistant protein-dialdehyde copolymer film on a base or supporting material such as paper, leather, textiles and the like. The invention also includes liquid compositions containing proteins and polymeric dialdehydes which deposit residues of said modified proteins under appropriate conditions as will be disclosed herein. A still further object of this invention is to obtain improved resistance to penetration of aqueous liquids of acid, neutral, or alkaline nature by applying the novel protein-dialdehyde copolymer as a surface sizing or coating solution or dispersion to or upon said base materials.

The present invention is concerned with the modification of casein but is not limited to this protein.

It is well known in the art that both casein and isolated soybean protein for use as a clear or pigmented coating for paper must be insolubilized for most such applications. In general, these proteins are solubilized in alkaline solutions and then rendered insoluble on the base material by the following methods:

(1) Addition of insolubilizing agent to the coating mixture before application on the machine.
(2) Application of insolubilizing agents to the dried coating film from a bath.
(3) Application of reagents to the wet or dried film by reaction with volatile compounds.

Multivalent metallic ions such as aluminum react with casein to form an insoluble caseinate but in general formaldehyde is used as the insolubilizing agent for casein for use in paper coating and leather finishing.

However, the use of formaldehyde presents a health hazard to paper coating operators through its toxic vapors which also irritate the eyes and mucous membranes. Further disadvantages in the above use of formaldehyde are its loss by volatilization during application and the need for a large excess to insure insolubilization of the proteins. Papers coated with poorly prepared formaldehyde-protein mixtures may liberate formaldehyde and cause eye, throat and skin irritation to personnel in the printing or lithographing plants where the paper is used. Glyoxal is also used to some extent to insolubilize protein but this compound has not proved to be satisfactory because it turns casein a dark brown color which obviously limits its use in paper coating.

It is therefore an object of this invention to provide a process whereby the protein is insolubilized by a nonvolatile and non-irritating dialdehyde through copolymer formation. A further object of this invention is to provide a process whereby vegetable protein may be treated with a polymeric insolubilizing agent in fixed minimum amounts not subject to loss by volatilization for better control of insolubilization of the protein. Papers coated with the protein-dialdehyde copolymers of this invention are not capable of liberating toxic and irritating vapors during subsequent processing. A further object of this invention is to provide a casein highly polymeric dialdehyde reaction product which is much more impervious to the action of acid, neutral and alkaline aqueous solutions than unmodified casein and which is practically colorless.

In general the present invention comprises modifying proteins by reaction with a highly polymeric dialdehyde in aqueous dispersion in the pH range 6–7.5 to produce a substituted protein or copolymer of high molecular weight having value as a coating composition for paper, leather and textiles.

The structure of the monomer units in the polymeric dialdehyde used in the invention may be represented as

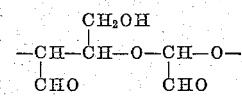

The specific highly polymeric dialdehyde is prepared commercially by oxidizing starch to the extent of at least 90 percent with periodic acid. The polymeric dialdehyde is dispersed in mildly alkaline solutions such as borax solutions, the final dispersion being in the pH range of 5 to 7 to prevent discoloration. The free amino groups and possibly the amide groups in the protein apparently react with the dialdehyde function of the dialdehyde polymer to form the products of the present invention.

However, the reaction of proteins with aldehydes is not well understood and the products of the invention are not limited to this mechanism of reaction.

It is necessary that the pH of the dispersion be controlled during the reaction of the polymeric dialdehyde and the protein. A pH of 6 to 7.5 can be used for producing a nearly colorless reaction mixture. Although the use of higher pH values increases the rate of reaction, they may also produce undesirable side reactions with color formation. Reactivity is lower under acidic conditions, but under highly acidic conditions colored solutions may be obtained. It is also preferred to carry out the reaction at room temperature to reduce coloration. A period of reaction of one-half to three hours at room temperature at pH 6 to 7.5 produces a satisfactory disperson for paper coating. The water dispersed polymeric dialdehyde and casein are present in the reaction mixture in the weight ratio of about 1 to 10, respectively, using a concentration of casein up to 10 percent. As an example, 100 ml. of a reaction mixture suitable for coating paper may contain 7 grams of casein and 0.7 gram of dialdehyde polymer. Irreversibly insoluble copolymers were obtained in good yield by reacting polymeric dialdehyde with protein in the amount of 10 percent to 20 percent of the protein. The present invention utilizes borax to solubilize both the protein and polymeric dialdehyde as well as act as a preservative for the protein by inhibiting bacterial action. However, the dispersing agent is not limited to borax and may be sodium hydroxide, sodium carbonate, ammonia or other soluble alkaline materials.

There are various ways in which the coating compositions of this invention may be prepared. Thus the casein and polymeric dialdehyde may be mixed in the dry state for storage or transport, preferably without the alkaline dispersing agent, and dispersed in water prior to application as a coating composition with the addition of the alkaline agent at that time. Another method of preparing the casein-polymeric dialdehyde compositions of this invention is to dissolve or disperse the polymeric dialdehyde in an aqueous solution containing an alkali such as borax after which the casein or a slightly alkaline solution of casein is added in the appropriate weight ratio of casein to polymeric dialdehyde to produce the coating composition of the invention. The invention is not limited, however, to these methods of preparation of the composition of the invention. Films or coatings of this invention may contain mineral pigment such as clay or other particles in addition to the protein-polymeric dialdehyde composition as illustrated in the examples.

The following examples illustrate the composition and method of the present invention.

*Example 1*

Corn starch was oxidized with periodic acid to the extent of 95 percent to give a highly polymeric dialdehyde. A stock solution of the polymeric dialdehyde was prepared by addition of 38.6 g. thereof (containing 11% moisture) to 90 ml. of aqueous borax solution (3.05 g. borax) at 60° C. and heating to 73° C. (5-10 minutes). Its pH was 5.4. A casein solution was also prepared by addition of 2.0 g. of casein (dry basis) to 200 ml. of water followed by 0.2 g. of borax with agitation (pH 8.1). Forty ml. of the dialdehyde solution was slowly added to the casein solution at room temperature. The pH of the mixture was 6.7 and was adjusted to pH 7.2 by addition of alkali. After 3 hours of reaction the pH of the solution was lowered to 3.7 with hydrochloric acid to precipitate the reaction product. The crude product contained practically all of the casein in chemical combination with the polymeric dialdehyde. Purification by extraction with borax solution followed by dialysis gave a product in about 98 percent yield which contained 12.54 percent nitrogen calculated on a dry basis. Casein contains 15.8 percent nitrogen (dry basis) and the factor for conversion of percent nitrogen to percent casein is 6.35. Calculation of composition of the reaction product: $12.54\% \times 6.35 = 79.63\%$ combined casein in product. The light colored copolymer was therefore composed of 80 percent casein and 20 percent of polymeric dialdehyde. Acid hydrolysis of the product in the presence of p-nitrophenylhydrazine gave a nearly quantitative analysis for combined polymeric dialdehyde present. The product is practically insoluble in dilute alkali and dilute acid which properties are completely different from those of free casein and of free polymeric dialdehyde. Because of this irreversible insolubility of the product it has utility as a coating agent or film for paper, leather, and textiles.

A high weight ratio of polymeric dialdehyde to protein (6 to 1) was used in this reaction to produce a copolymer containing 20 percent of dialdehyde and 80 percent of casein. This apparently is the maximum amount of dialdehyde that will react with the casein to form a copolymer. A weight ratio of polymeric dialdehyde to casein of 1 to 1 produced a copolymer containing 15 percent dialdehyde and 85 percent casein. In these cases a 1 percent dispersion of casein was used.

*Example 2*

The composition of the polymeric dialdehyde-casein copolymer can be varied to obtain a lower percentage of dialdehyde than the maximum of Example 1, and is dependent upon the concentration and the ratio of dialdehyde to a casein used in the reaction. A copolymer composed of 10 percent dialdehyde polymer and 90 percent of casein was prepared using the dialdehyde polymer and casein in the weight ratio of 1 to 10. The concentration of casein in dispersion was 7 percent.

To 45 ml. of water at 60° C. was added 5.6 g. of the polymeric dialdehyde of Example 1 followed by 0.5 g. of borax and heated 5 to 10 minutes to reach a temperature of 73° C. and then cooled and diluted to 50 ml. Seven ml. of this dispersion (0.7 g. dialdehyde) was then added to 93 ml. of a casein-borax dispersion containing 7 g. of casein. The pH of the mixture was 7.1. The reaction was allowed to proceed for 15 minutes and the pH dropped to 6.9. Alkali was added to readjust the pH to 7.1. After 2 hours more of reaction the copolymer dispersion was diluted with $H_2O$ and precipitated at pH 3.8 by addition of hydrochloric acid. The produce was isolated in quantitative yield and was found to be substantially insoluble in dilute alkali and dilute acid solutions. Analysis of the purified copolymer: N 14.2 percent (dry basis); $14.2 \times 6.35 = 90.2$ percent casein. This copolymer is therefore composed of 90 percent casein and 10 percent dialdehyde.

In another experiment using the same conditions of reaction, the reaction mixture was used to coat paper. The dried coated paper was tested for water resistance and wet-rub resistance and gave the following results:

| Paper | Water resistance, penetration time, hrs. | | | Wet-rub resistance |
|---|---|---|---|---|
| | pH 5 | pH 7 | pH 10 | |
| Coated with copolymer | >24 | 23 | >24 | Excellent. |
| Coated with casein alone | 2.6 | 2.6 | 2.6 | Fair. |
| Not coated | 0.20 | 0.22 | 0.25 | Poor. |

*Example 3*

Five grams of polymeric dialdehyde of Example 1 was added to 50 ml. of a 1 percent borax solution and heated at 70° C. with stirring for about 15 minutes. The pH of the dispersion was approximately 6.

A casein solution was prepared by addition of 15 grams of casein to 170 ml. of water containing 1.32 grams of borax and stirring for 30 minutes until dissolved. The pH of the solution was 7.1

The coating dispersion was made by adding 14 ml. of the polymeric dialdehyde dispersion (1.4 grams of dialdehyde) to the casein solution with continuous stirring and adjusting the pH to 7.2 by addition of 0.3 ml. of N sodium hydroxide solution. After one hour of reaction at room temperature the pH was 7.1. After 2 hours of reaction at pH 7 the viscous copolymer dispersion was applied to both sides of a sheet of paper as a coating. The dried coated paper was tested for water resistance by TAPPI method T–433 M–41 using water at pH of 5, 7 and 10, and for wet-rub resistance in the usual manner. The results of this evaluation are shown below.

| Paper | Water resistance, penetration time, hrs. | | | Wet-rub resistance |
|---|---|---|---|---|
| | pH 5 | pH 7 | pH 10 | |
| Coated with copolymer | >24 | >24 | >24 | Excellent. |
| Coated with casein | 2.7 | 2.6 | 2.6 | Fair. |
| Not coated | 0.20 | 0.22 | 0.25 | Poor. |

The time for N/10 sodium hydroxide (pH 13) to penetrate the copolymer treated paper was greater than 8 hours and further illustrates the alkali insolubility of the copolymer. Casein alone is soluble in alkali.

The copolymer coating on each side of the dried paper weighed 15 grams per square meter.

*Example 4*

Preparation of dispersions:
(1) 15 g. of casein were added to 52 ml. of water and stirred into a paste and 1.3 g. of borax then added and heated to 50° C. to disperse the casein.
(2) 70 g. of clay pigment and 30 g. of calcium carbonate pigment were dispersed in an aqueous solution containing 0.4 g. of sodium pyrophosphate.
(3) 1.5 g. of polymeric dialdehyde of Example 1 was added to 15 ml. of a 1 percent borax solution and agitated and heated at 70° C. for 10-15 minutes.

Dispersions 1 and 2 were mixed and dispersion 3 was then added and adjustment made to pH 7.2. After one hour of reaction, the fluid composition was spread upon each side of a paper base by means of a blade and dried. The weight of the dry coating on each side of the paper was 22 g. per square meter. The paper had excellent water resistance and good wet-rub resistance. Over 24 hours were required for water to penetrate the coating.

*Example 5*

Preparation of dispersions:

(1) 15 grams of casein were dispersed in 52 ml. of water containing 1.3 grams of borax as in Example 4.

(2) 100 grams of clay pigment were dispersed in 86 ml. of water containing 0.4 g. sodium hexametaphosphate.

(3) 1.50 grams of polymeric dialdehyde of Example 1 was added to 15 ml. of 1 percent borax solution and dispersed as in Example 4.

Dispersions 1 and 2 were thoroughly mixed and dispersion 3 then added and the pH adjusted to 6 with hydrochloric acid. After 30 minutes of reaction the viscous mixture was spread on each side of a paper base with a blade and dried. The weight of the dry coating on each side of the paper was 18 grams per square meter.

The dry coatings had excellent water resistance and good wet-rub resistance as shown below.

| Paper | Water resistance, penetration time, hrs. | Wet-rub resistance |
| --- | --- | --- |
| Coated with copolymer and clay | >24 | Excellent. |
| Coated with casein and clay | 2.6 | Fair. |
| Not coated | 0.22 | Poor. |

*Example 6*

Dispersions of casein, clay and polymeric dialdehyde were made and mixed as in Example 5, but the pH was adjusted to 6.5. Reaction was carried out for 3 hours before the paper was coated.

The dry coatings had excellent resistance to penetrations by water of over 24 hours and excellent wet-rub resistance. The weight of the dry coatings on each side of the paper was 20 grams per square meter.

*Example 7*

A dry mixture of 1 gram of polymeric dialdehyde prepared by essentially complete periodic acid oxidation of starch and 10 grams of casein was stored at room temperature for a month with little change in appearance. The mixture was dispersed in 152.5 ml. of water containing 1 gram of borax by stirring and then heating at 70° C. for several minutes. A dry mixture of 66.7 grams of clay and 0.27 gram of sodium hexametaphosphate was added and the whole stirred well (pH 6.15) and adjusted to pH 7. After 20 hours of standing a bleached sulfate paper containing 10 percent of clay filler was coated with this mixture and after drying had a coating on each side of 17 grams per square meter.

The results of the evaluation of the water resistance properties of the coated paper are presented below:

| Paper | Water resistance, penetration time, hrs. | Wet-rub Resistance |
| --- | --- | --- |
| Coated with copolymer and clay | >24 | Excellent. |
| Coated with casein and clay | 2.6 | Fair. |
| Not coated | 0.22 | Poor. |

*Example 8*

Preparation of dispersion:

(1) 7 gms. of soybean alpha protein was dispersed in 26 ml. of tap water with 1 ml. of 5 N NaOH (pH 9.0).

(2) 50 grams of clay were dispersed in 43 ml. of tap water containing 0.2 gram of sodium hexametaphosphate.

(3) 0.75 gram of dialdehyde polymer was added to 7.5 ml. of 1 percent borax solution and dispersed at 73° C. for 10 minutes and cooled.

Dispersions 1 and 2 were mixed and dispersion 3 added and the whole adjusted to pH 7.5, and mixed well. After 15 minutes of reaction the viscosity of the mix was 15,000 cps. and paper was coated therewith. The weight of the copolymer-clay coating on each side of the paper was 13 grams per square meter. The coating had excellent resistance to water, as over 24 hours were required for water to penetrate the paper sheet.

Paper with a soybean alpha protein-clay coating of 12 grams per square meter was penetrated by water in less than two minutes.

The above examples show that the application of this invention provides a method of insolubilizing casein and soybean protein without appreciable coloration and in the absence of irritating vapors for the production of paper coatings having excellent water resistance, good wet-rub resistance and color. It is also possible to prepare a dry stable mixture of polymeric dialdehyde and casein capable of being stored for reasonable periods of time without deterioration. Such casein mixtures cannot be prepared with formaldehyde, glyoxal or glutaraldehyde, which aldehydes are generally commercially available only in aqueous solution. The dry mixture is readily converted to the composition of the invention by simple dispersion in borax or dilute alkali solutions. Finally, the invention affords a method of reacting casein with fixed minimum amounts of a dialdehyde without loss of the latter by volatilization and with the absence of irritating vapors.

Other vegetable proteins such as cotton seed and peanut proteins, as well as blood and animal proteins such as glue and hide substances can be substituted for the casein or soybean protein and reacted with the polymeric dialdehyde, according to the method of the invention.

We claim:

1. A method of preparing a copolymer of a protein selected from the group consisting of casein and soybean protein and a highly polymeric dialdehyde comprising reacting a said protein in aqueous dispersion with 10 percent to 20 percent of its dry weight of the highly polymeric dialdehyde at a pH in the range 6 to 7.5, said highly polymeric dialdehyde having been formed by essentially complete periodic acid oxidation of starch to the extent where at least 90% of the anhydroglucose units of the starch are in the dialdehyde form.

2. A method of preparing a copolymer of casein and a highly polymeric dialdehyde comprising reacting casein in aqueous dispersion with 10 percent to 20 percent of its dry weight of the highly polymeric dialdehyde, in the pH range 6 to 7.5, said highly polymeric dialdehyde having been formed by essentially complete periodic acid oxidation of starch to the extent where at least 90% of the anhydroglucose units of the starch are in the dialdehyde form.

3. A copolymer of a protein selected from the group consisting of casein and soybean protein and a highly polymeric dialdehyde, said dialdehyde having been produced by essentially complete periodic acid oxidation of starch to the extent where at least 90% of the anhydroglucose units of the starch are in the dialdehyde form.

4. A copolymer of casein and a highly polymeric dialdehyde, said dialdehyde having been produced by essentially complete periodic acid oxidation of starch to the extent where at least 90% of the anhydroglucose units of the starch are in the dialdehyde form.

5. A copolymer of soybean protein and a highly polymeric dialdehyde, said dialdehyde having been produced by essentially complete periodic acid oxidation of starch to the extent where at least 90% of the anhydroglucose units of the starch are in the dialdehyde form.

6. A method for preparing a copolymer of a protein selected from the group consisting of casein and soybean protein and a highly polymeric dialdehyde which comprises reacting, in aqueous dispersion, a said protein and a highly polymeric dialdehyde, said dialdehyde having been produced by essentially complete periodic acid oxidation of starch to the extent where at least 90% of the anhydroglucose units of the starch are in the dialdehyde form.

7. A method for preparing a copolymer of casein and a highly polymeric dialdehyde which comprises reacting, in aqueous dispersion, casein and a highly polymeric dialdehyde, said dialdehyde having been produced by essentially complete periodic acid oxidation of starch to the extent where at least 90% of the anhydroglucose units of the starch are in the dialdehyde form.

8. A method for preparing a copolymer of soybean protein and a highly polymeric dialdehyde which comprises reacting, in aqueous dispersion, soybean protein and a highly polymeric dialdehyde, said dialdehyde having been produced by essentially complete periodic acid oxidation of starch to the extent where at least 90% of the anhydroglucose units of the starch are in the dialdehyde form.

9. A method of increasing the water resistance of paper which comprises applying to paper an aqueous dispersion of a copolymer of a protein selected from the group consisting of casein and soybean protein and a highly polymeric dialdehyde obtained by the substantially complete periodic acid oxidation of starch and drying the paper, said starch having been oxidized to the extent where at least 90% of the anhydroglucose units of the starch are in the dialdehyde form.

10. The method of claim 9 wherein the protein is casein.

11. The method of claim 9 wherein the protein is soybean protein.

12. The coating composition of claim 14 wherein the protein is casein.

13. The coating composition of claim 14 wherein the protein is soybean protein.

14. A coating composition for greatly increasing the wet strength and the imperviousness of paper to dilute aqueous solutions of acid and alkali without the release of volatile irritants, said composition comprising a substantially neutral aqueous borax dispersion of a protein-dialdehyde copolymer, said copolymer consisting of a protein selected from the group consisting of casein and soybean protein having chemically bound thereto from 10 to 20 percent by weight based on the dry weight of the protein of a periodate oxidized starch in which at least 90 percent of the anhydroglucose units are in the dialdehyde form.

References Cited by the Examiner
UNITED STATES PATENTS 2,606,188   8/52   Yelland _____ 260—233.3
2,885,374   5/59   Sweeney _____ 260—6

OTHER REFERENCES

Sutermeister et al.: Casein and its Industrial Applications (1939), Reinhold Publishing Corp., New York, pages 335–337.

WILLIAM H. SHORT, *Primary Examiner.*

MILTON STERMAN, LEON J. BERCOVITZ, JAMES A. SEIDLECK, *Examiners.*